Jan. 18, 1966     D. S. THOMPSON     3,229,593
METHOD OF FORMING A LINED FIBER CONTAINER
Original Filed Oct. 20, 1961
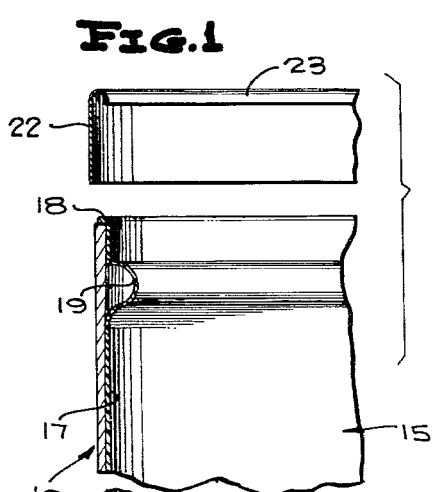
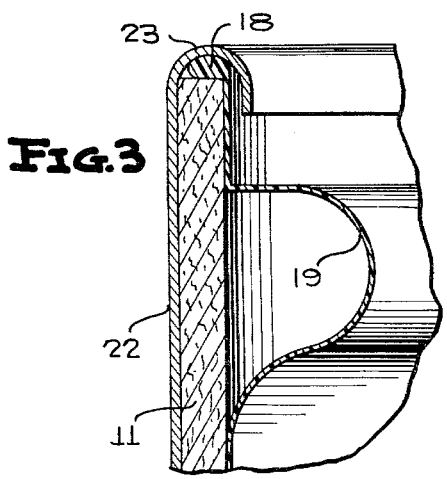
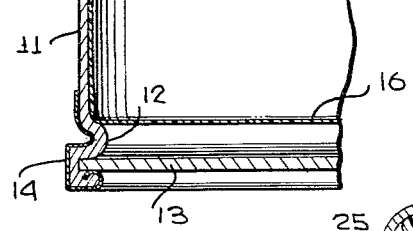
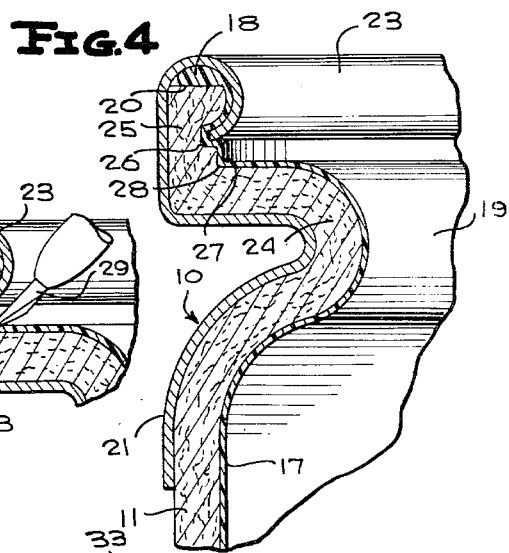
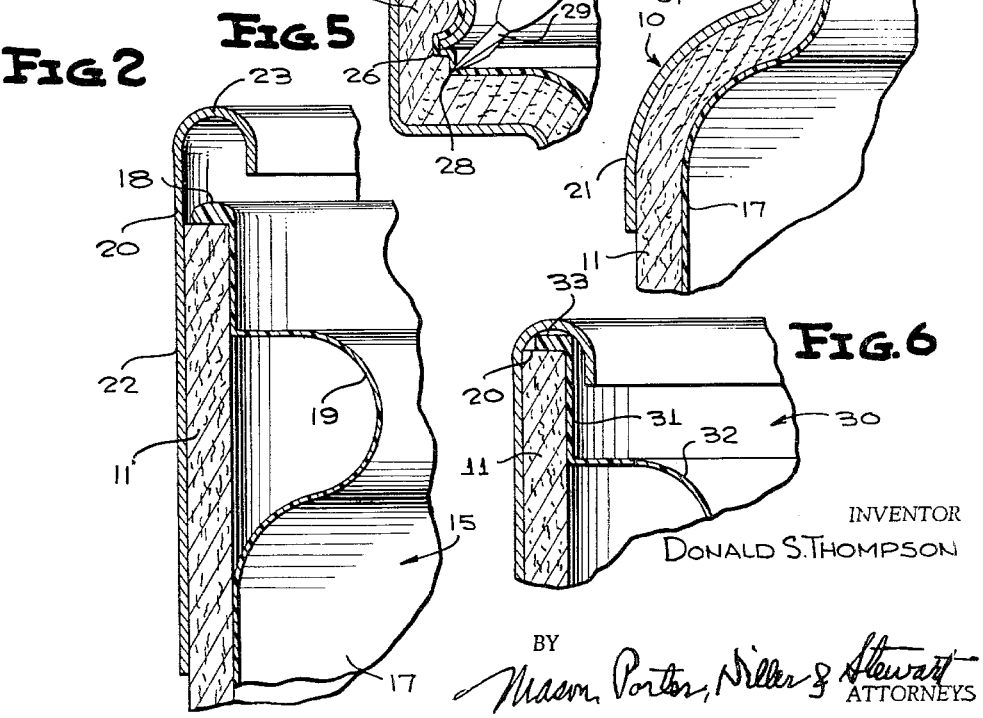
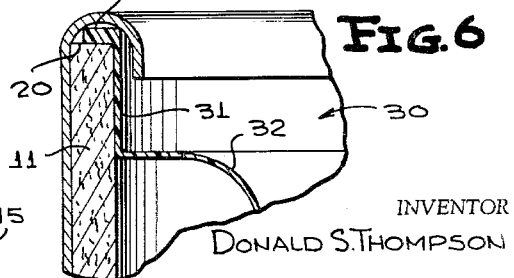
INVENTOR
DONALD S. THOMPSON
BY Mason, Porter, Diller & Stewart
ATTORNEYS

United States Patent Office 3,229,593
Patented Jan. 18, 1966

3,229,593
METHOD OF FORMING A LINED FIBER CONTAINER
Donald S. Thompson, Pound Ridge, N.Y., assignor to Continental Can Company, Inc., New York, N.Y., a corporation of New York
Original application Oct. 20, 1961, Ser. No. 146,467, now Patent No. 3,158,311, dated Nov. 24, 1964. Divided and this application June 5, 1964, Ser. No. 372,976
7 Claims. (Cl. 93—36.01)

This is a division of my copending commonly assigned application Serial No. 146,467 filed October 20, 1961, and now U.S. Patent No. 3,158,311 issued November 24, 1964. This invention relates to a novel method of forming a fiber container with a plastic liner sealed in a chime of the container, and is particularly directed to assembling a preformed liner with a fiber container and shaping a portion of the container to the configuration of a portion of the preformed liner while simultaneously shaping a chime forming member to form a dual clamping between the container and the liner.

Heavy fiber containers or drums which have proved very satisfactory for some intended purposes have been on the market for a period of time. However, such containers are generally used for shipping bulk solid material and require the use of a liner to ship liquids in the containers. At present time, liners have been used in these fiber containers, but not with the desired results. For example, a semi-rigid plastic liner has been developed for insertion into fiber containers. This liner is very expensive, cannot be readily disposed of because of its costs so that the same fiber container may be further used for the shipment of granular material and other non-liquid materials, and have a top chime portion which is so thick that it is difficult to provide clearance to accommodate conventional covers and locking band structures.

Fiber containers of the type referred to above have also been provided with loose liners which are disposed freely within the fiber containers. These loose liners gather and bulge in spots and are subject to fatigue cracking due to the flexing thereof caused by the pulsating or sloshing action of liquids therein as vibration occurs in transit. On the other hand, if the liner is made short enough so that there will be no gathering and bulging thereof, the liner has a tendency to slip down into the container during assembly of the liner and an associated container, as well as during the filling of the liner with undesired results.

Such fiber containers and liners are manufactured in various ways, each of which includes one or more shortcomings. For example, it is well known to form fiber containers by spiral winding paperstock material on a winding mandrel to form a generally cylindrical fiber container body. This body is removed from the mandrel, a bottom is secured therein and an upper portion of the body is contoured to receive a chime. Prior to rolling a portion of the chime a thin flexible liner is inserted in the container and a free edge of the rolled chime clamps an upper portion of the liner to the container body. Difficulties have been encountered in the formation of such fiber containers, particularly in maintaining the liner accurately positioned within the container during the forming of the chime. The liner, as has been heretofore noted, has a tendency to slip down into the container or shifts relative to the container thus resulting in an incomplete or defective securement of the liner in the fiber container.

These disadvantages have been mitigated to a certain extent by first spiral winding liner material upon a mandrel and thereafter adhesively spiral winding container-forming material, such as paperstock material, on the spiral wound liner. The composite container body thus formed is removed from the mandrel and the fabrication thereof is thereafter completed. This method of forming lined fiber containers is disadvantageous from the standpoint of the complex operation of spiral winding both the liner forming material and the container forming material.

A further disadvantage of this latter described method is the necessity of separately sealing a bottom wall to the container body because the spiral wound liner is necessarily bottomless.

In view of the foregoing, it is a primary object of this invention to provide a novel method of inexpensively forming and assembling a preformed liner and a container body by which the above and numerous other disadvantages of forming lined fiber drums are substantially eliminated.

In keeping with this invention, a novel preformed liner having an upper radially outwardly directed thickened flange is telescoped into a cylindrical fiber container, the flange is positioned upon and supported by a free terminal edge of the fiber container, and a chime forming member is telescoped upon and contactingly engages the flange of the preformed liner to support the liner relative to the container body so that slippage of the liner into the container body during a subsequent shaping operation is substantially eliminated.

A further object of this invention is to provide a novel method of forming a lined fiber container by first preforming a liner having an upper radially outwardly directed flange and an inwardly directed circumferential bead, telescopically inserting the liner into a generally cylindrical container body with the flange seated upon and supported by a free terminal edge of the container body, telescopically engaging a chime forming member about the container body with a downwardly and inwardly opening channel portion of the chime forming member contactingly engaging the liner flange, and simultaneously shaping both the chime forming member and the container to the general configuration of the liner bead to clamp the liner relative to the container body both at the terminal edge and shaped portion of the container.

A further object of this invention is to provide a novel method of securing a liner to a fiber container by preforming a cylindrical liner having an outwardly directed upper flange and an inwardly directed circumferential bead, telescoping the liner into the container with the liner flange seated upon and supported by a terminal edge of the container with a bottom of the liner spaced from a bottom wall of the container, placing a chime forming member on the container with an inwardly and downwardly opening curved portion of the chime forming member contactingly engaging the liner flange and then both shaping the curved portion to clamp the liner flange against the terminal container edge and a portion of the container to the configuration of the inwardly directed liner bead whereby the liner is secured to the container by both the chime and the shaped portion of the container.

With the above and other objects in view that will hereinafter appear, the nature of the invention will be more clearly understood by reference to the following detailed description, the appended claims and the several views illustrated in the accompanying drawing.

In the drawing:

FIGURE 1 is an enlarged fragmentary exploded vertical sectional view taken through a fiber container in accordance with this invention and shows the same after a preformed liner has been initially positioned in the container and prior to the positioning of the chime forming member.

FIGURE 2 is an enlarged fragmentary vertical sectional view taken through the upper portion of the container showing the specific configuration of the upper portion of the liner, the chime forming member being adjacent to but not in its fully telescoped position with respect to the container.

FIGURE 3 is an enlarged fragmentary vertical sectional view similar to FIGURE 2, and shows the chime forming member in position prior to the shaping of the upper portion of the container and of the chime forming member.

FIGURE 4 is an enlarged fragmentary vertical sectional view similar to FIGURE 2, and shows the container with the upper portion thereof and the chime forming member shaped, and the chime forming member now being in the form of a chime clamping the upper portion of the liner to the upper portion of the container.

FIGURE 5 is an enlarged fragmentary vertical sectional view taken through the upper portion of the completed container and shows the manner in which the liner may be readily removed from the container utilizing a simple cutting implement.

FIGURE 6 is an enlarged fragmentary vertical sectional view similar to FIGURE 3 and shows a liner with a modified form of retaining flange, the liner being supported by its flange and slightly contactingly engaged by the chime forming member prior to a shaping operation.

Referring now to the drawing in detail, it will be seen that there is illustrated in FIGURE 1, a partially assembled fiber container formed in accordance with this invention, the fiber container being referred to in general by the numeral 10. The fiber container 10 includes a generally cylindrical fiber body 11 which has the lower portion thereof shaped as at 12 to receive a bottom 13 which may be formed of fibrous material or could be formed of metal, as desired. The lower portion of the container body 11 is reinforced by a lower metal chime member 14.

The container 10 is provided with a semi-rigid plastic liner 15 which may be formed of polyethylene, for example, or other similar plastics. The liner 15 is provided with an integral bottom 16, a body portion 17 and a radially outwardly directed retaining flange 18. In addition, an upper portion of the liner 15 is shaped in the form of an inwardly directed circumferential bead 19.

The upper portion of the container body 11 is initially cylindrical, and while the container body is in this shape, the liner 15 is telescoped therein, as is generally shown in FIGURE 1. When the liner 15 is telescoped within the container body 11, the outwardly directed flange 18 rests upon an extreme upper end 20 of the container body 11.

The container 10 is of the type having an upper metal chime 21 reinforcing the upper part of the container body 11. The chime 21 is initially in the form of a chime forming member 22 which is of a cylindrical configuration and has an inwardly and downwardly curved upper portion 23. The chime forming member 22 is telescoped down over the upper portion of the container body 11 after the liner 15 has been placed within the container body 11, and the inwardly and downwardly turned upper portion 23 is telescoped down over the upper end 20 of the container body 11 and the flange 18 of the liner, which flange is seated on the container body end 20 (FIGURE 2).

The inwardly turned upper portion 23 is then fully telescoped down and upon in slight contacting engagement with the flange 18 of the liner 15, as is best illustrated in FIGURE 3 of the drawing. After the chime forming member 22 is in the position illustrated in FIGURE 3, by suitable conventional means the upper portion of the container 10 is shaped with the container body 11 and the chime forming member 22 being simultaneously shaped. As a result, the upper portion of the container body 11 is provided with an inwardly directed bead 24 which fills the bead 19 of the liner 15. During the shaping of the container body 11 and the chime forming member 22, the flange 18 is clamped against the upper end 20 of the container body 11 by the upper portion 23, as is best illustrated in FIGURE 4 of the drawing. Further, the inturned portion 23 of the chime forming member 22 is turned into the inner wall surface of an extreme upper part 25 of the container body 11 to clamp the body portion 17 of the liner 15 against the inner surface of the container body 11. It is to be noted that the liner body 17 is slightly interlocked with the container body 11, as at 26. This interlock, together with the clamping of the flange 18 against the end 20 of the container body 11 and the bead 24 filling the bead 19 of the liner 15 results in firm clamping of the liner 15 within the completed container 10.

As is best shown in FIGURE 1, the bottom 16 of the liner 15 is disposed slightly above the bottom 13 of the container 10. Thus, when the container 10 equipped with the liner 15 is filled with a liquid, the liner 15 may stretch until the bottom 16 rests upon the bottom 13. This tensioning of the body 17 of the liner 15 results in the elimination of any creases or bulges which could result in fatigue cracking of the liner 15.

Referring once again to FIGURE 4 and also making reference to FIGURE 5, it will be seen that in the formation of the bead 24 there is formed an upwardly directed shoulder 27 which may be considered a cover engaging shoulder. This shoulder, together with the upper portion 25 of the container body 11, defines a corner area 28 in which an upper portion of the liner body 17 is engaged. This corner portion 28 facilitates the severing of the liner body immediately below the chime portion 23 by means of a penknife or other cutting implement 29, as is best shown in FIGURE 5. Once the liner body has been severed in the corner area 28, the liner 15 may be removed from within the container 10 and the container 10 is then suitable for use in the storage and shipment of non-liquid materials.

In FIGURE 6 there is illustrated a slightly modified form of liner which is referred to by the numeral 30. The liner 30, like the liner 15, includes a liner body 31 having an upper portion shaped to define a radially inwardly directed circumferentially bead 32 and terminates at the extreme upper end in an outwardly directed flange 33. The flange 33, unlike the flange 18 which is molded to conform generally to the shape of the upper portion of the chime 21, is merely flat. It is not necessary that the flange 33 substantially fill the chime 21 above the upper end 20 of the container body 11, it being merely necessary that the chime 21 clamps the flange 33 against the upper end 20 of the container body 11 of FIGURE 6. It is also pointed out that the liner 30, like the liner 15, will be additionally secured in place within the container body 11 by the engagement of the inner edge of the chime 21 with the liner body 31 to effect a clamping thereof against the upper portion of the container body 11, and a portion of the container body 11 received in the bead 32 similarly enhances this clamping action.

From the foregoing, it will be readily apparent that the liner construction disclosed herein overcomes many of the deficiencies of known fiber container and liner constructions resulting from or directly attributed to the manufacture thereof, and at the same time, is very inexpensive and may be employed to form existing container body structures without modifications thereto. In addition, the liner may be readily and easily removed from the container so as to permit the use of the container in the normal manner.

It is believed apparent from the foregoing, that novel and advantageous provision has been made for carrying out the desired end. However, attention is directed to the fact that additional variations may be made in the method disclosed herein without departing from the spirit and

I claim:

1. A method of securing a liner to a fiber container comprising the steps of providing a liner having an outwardly directed upper flange, telescoping the liner into the container with the liner flange resting on the end of the container, placing a chime forming member on the end of the container in a liner engaging position, and then shaping both the chime forming member and an upper part of the container and clamping the liner against the container by the shaped chime.

2. A method of securing a liner to a fiber container comprising the steps of preforming a liner having an outwardly directed upper flange, telescoping the liner into the container with the liner flange seated on the end of the container, telescoping a chime forming member on the end of the container with an inwardly downwardly opening curved portion of the chime forming member contacting the liner flange, and then shaping both the chime forming member and an upper part of the container and clamping the liner against the container by the shaped chime.

3. A method of securing a liner to a fiber container comprising the steps of preforming a liner having an outwardly directed upper flange and an inwardly directed bead, telescoping the liner into the container with the liner flange resting on the end of the container, placing a chime forming member on the end of the container in a liner engaging position, and then shaping both the chime forming member and an upper part of the container to the configuration of the bead whereby the liner is held in the container by both the shaped chime and the upper part of the container.

4. A method of securing a liner to a fiber container comprising the steps of preforming a cylindrical liner having an outwardly directed upper flange and an inwardly directed bead, telescoping the liner into the container with the liner flange seated on and supported by an upper terminal edge of the container, placing a chime forming member on the container with an inwardly and downwardly opening curved portion of the chime forming member contacting the liner flange, and then both shaping the curved portion to clamp the liner flange against the terminal container edge and a portion of the container to the configuration of the inwardly directed bead whereby the liner is secured to the container by both the chime forming member and the shaped portion of the container.

5. A method of securing a liner to a fiber container comprising the steps of preforming a cylindrical liner having an outwardly directed upper flange and an inwardly directed circumferential bead, telescoping the liner into the container with the liner flange seated on and supported by an upper free terminal edge of the container and a bottom of the liner spaced from a bottom of the container, placing a chime forming member on the container with an inwardly and downwardly opening curved portion of the chime forming member contactingly engaging the liner flange and then both shaping the curved portion to clamp the liner flange against the terminal container edge and a portion of the container to the configuration of the inwardly directed bead whereby the liner is secured to the container by both the chime forming member and the shaped portion of the container.

6. A method of securing a liner to a fiber container comprising the steps of preforming a cylindrical liner having an outwardly directed upper flange and an inwardly directed circumferential bead, telescoping the liner into the container with the liner flange seated wholly upon and supported by an upper free terminal edge of the container and a bottom of the liner spaced from the bottom of the container, placing a chime forming member on the container with an inwardly and downwardly opening curved portion of the chime forming member contactingly engaging the liner flange and then both shaping the curved portion to clamp the liner flange against the terminal container edge and a portion of the container to the configuration of the inwardly directed bead whereby the liner is secured to the container by both the chime forming member and the shaped portion of the container.

7. A method of securing a liner to a fiber container comprising the steps of providing a liner having an outwardly directed upper flange, telescoping the liner into the container with the liner flange resting on the end of the container, placing a chime forming member on the end of the container in a liner flange clamping position, and then shaping both the chime forming member and an upper part of the container whereby the liner is held in the container by both the shaped chime forming member and the upper part of the container.

References Cited by the Examiner

UNITED STATES PATENTS

| | | | |
|---|---|---|---|
| 2,798,654 | 7/1957 | Gibbs | 220—63 X |
| 2,884,176 | 4/1959 | Carpenter et al. | 93—39.1 |
| 3,126,797 | 3/1964 | Carpenter et al. | 93—36.01 |

FOREIGN PATENTS 303,553   12/1932   Italy.

FRANK E. BAILEY, *Primary Examiner.*

BERNARD STICKNEY, *Examiner.*